(12) United States Patent
Akasaka

(10) Patent No.: US 11,933,813 B2
(45) Date of Patent: Mar. 19, 2024

(54) WIND MEASURING SYSTEM

(71) Applicant: ROHM Co., LTD., Kyoto (JP)

(72) Inventor: Shunsuke Akasaka, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 255 days.

(21) Appl. No.: 17/472,822

(22) Filed: Sep. 13, 2021

(65) Prior Publication Data

US 2022/0091149 A1 Mar. 24, 2022

(30) Foreign Application Priority Data

Sep. 18, 2020 (JP) .................. 2020-157414

(51) Int. Cl.
*G01P 5/12* (2006.01)
*G01P 5/00* (2006.01)
*G01P 5/08* (2006.01)

(52) U.S. Cl.
CPC ................ *G01P 5/001* (2013.01); *G01P 5/08* (2013.01)

(58) Field of Classification Search
CPC .... B01D 17/06; B01D 17/0205; B01D 17/12; E21B 49/08; G01N 27/10
See application file for complete search history.

(56) References Cited

FOREIGN PATENT DOCUMENTS

| JP | 2004265654 A | * | 9/2004 | |
|---|---|---|---|---|
| JP | 2005249565 | | 9/2005 | |
| JP | 2005249565 A | * | 9/2005 | |
| KR | 20030023145 A | * | 3/2003 | .......... B01J 19/0093 |

* cited by examiner

*Primary Examiner* — Tarun Sinha
*Assistant Examiner* — Drexel Alejandro Venero
(74) *Attorney, Agent, or Firm* — CHIP LAW GROUP

(57) ABSTRACT

Disclosed herein is a wind measuring system including a first flow sensor and plural second flow sensors. The first flow sensor and the plural second flow sensors each include a microheater including a board, an insulating film, and a heater. The board includes a first principal surface and a second principal surface. The board has defined therein an opening portion passing through the board along a direction from the first principal surface toward the second principal surface. The insulating film includes a peripheral portion disposed on the first principal surface, a central portion having the heater disposed thereon, and a connection portion extending from the central portion to be connected to the peripheral portion to support the central portion over the opening portion. The first flow sensor and the plural second flow sensors each output a signal that varies according to a change in electrical resistance value of the heater.

3 Claims, 7 Drawing Sheets

WIND MEASURING SYSTEM

CROSS REFERENCE TO RELATED APPLICATIONS

This application claims priority benefit of Japanese Patent Application No. JP 2020-157414 filed in the Japan Patent Office on Sep. 18, 2020. Each of the above-referenced applications is hereby incorporated herein by reference in its entirety.

BACKGROUND

The present disclosure relates to a wind measuring system. JP 2005-249565A describes an anemometer. The anemometer described in JP 2005-249565A includes a board. The board has defined therein a hole passing through the board along a thickness direction thereof. A mask film is disposed on a sensing side of the board. The mask film is supported over the hole defined in the board. A sensing resistor and first and second bonding pads electrically connected to the sensing resistor are disposed on the mask film.

If a voltage is applied between the first and second bonding pads, an electric current passes through the sensing resistor, so that the sensing resistor generates heat. If a wind passes in the vicinity of the sensing resistor, the temperature of the sensing resistor decreases according to the wind speed of the wind. Because an electrical resistance value of the sensing resistor is dependent on the temperature, the wind speed of the wind passing in the vicinity of the sensing resistor can be sensed by monitoring the electrical resistance value of the sensing resistor.

SUMMARY

However, the anemometer described in JP 2005-249565A is incapable of measuring the wind direction of a wind. The present disclosure has been made in view of such a problem of related-art techniques. More specifically, the present disclosure provides a wind measuring system capable of measuring both the wind speed and the wind direction of a wind.

A wind measuring system according to an embodiment of the present disclosure includes a first flow sensor and a plurality of second flow sensors. The first flow sensor and the plurality of second flow sensors each include a microheater. The microheater includes a board, an insulating film, and a heater. The board includes a first principal surface and a second principal surface opposite to the first principal surface. The board has defined therein an opening portion passing through the board along a direction from the first principal surface toward the second principal surface. The insulating film includes a peripheral portion disposed on the first principal surface, a central portion having the heater disposed thereon, and a connection portion extending from the central portion to be connected to the peripheral portion to support the central portion over the opening portion. The first flow sensor and the plurality of second flow sensors are each configured to output a signal that varies according to a change in electrical resistance value of the heater. The microheater of the first flow sensor is disposed such that the direction from the first principal surface toward the second principal surface is along a first direction. In each of the plurality of second flow sensors, the microheater is disposed such that the first principal surface and the second principal surface are each perpendicular to a plane perpendicular to the first direction. A direction from the second principal surface toward the first principal surface in the microheater of each of the plurality of second flow sensors forms a different angle with a second direction perpendicular to the first direction.

In the above wind measuring system, the direction from the second principal surface toward the first principal surface in the microheaters of the plurality of second flow sensors may form angles of 90°, 180°, 270°, and 0°, respectively, with the second direction.

In the above wind measuring system, the board may further include a side surface. Each of the plurality of second flow sensors may further include an integrated circuit (IC) chip and a bonding wire. The microheater of each of the second flow sensors may further include a first pad disposed on the peripheral portion and electrically connected to the heater, a standing wall disposed on the peripheral portion, and a conducting film. The standing wall may include a first surface continuous with the side surface, and a second surface opposite to the first surface. The conducting film may be formed over an area extending from on the first pad onto the second surface. The IC chip may include a third principal surface and a second pad disposed on the third principal surface. In each of the plurality of second flow sensors, the microheater may be disposed such that the side surface is opposed to the third principal surface. The second pad may be connected to a portion of the conducting film that lies on the second surface through the bonding wire.

The wind measuring system according to an embodiment of the present disclosure is capable of measuring both the wind speed and the wind direction of a wind.

DETAILED DESCRIPTION OF THE PREFERRED EMBODIMENT

Figure 1:
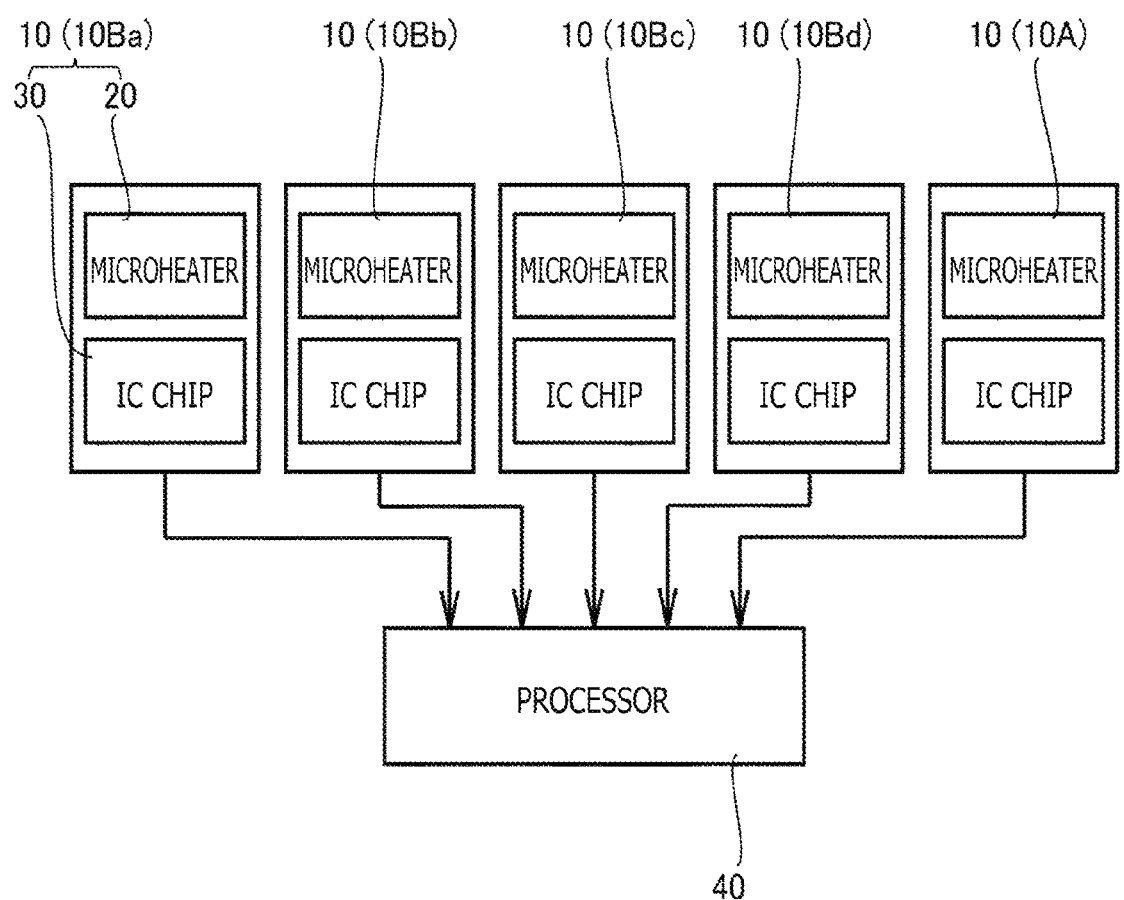
FIG. 1 is a functional block diagram of a wind measuring system.

An embodiment of the present disclosure will be described with reference to the accompanying drawings.

Here, like or corresponding parts are denoted by like reference characters, and redundant description will be omitted.

(Wind Measuring System according to Embodiment)

Hereinafter, the structure of a wind measuring system (hereinafter referred to as a "wind measuring system 100") according to an embodiment of the present disclosure will be described.

<Outline of Wind Measuring System 100>

FIG. 1 is a functional block diagram of the wind measuring system 100. As illustrated in FIG. 1, the wind measuring system 100 includes a plurality of flow sensors 10 and a processor 40. Each flow sensor 10 includes a microheater 20 and an IC chip 30.

<Detailed Structure of Flow Sensor 10>

Figure 2:
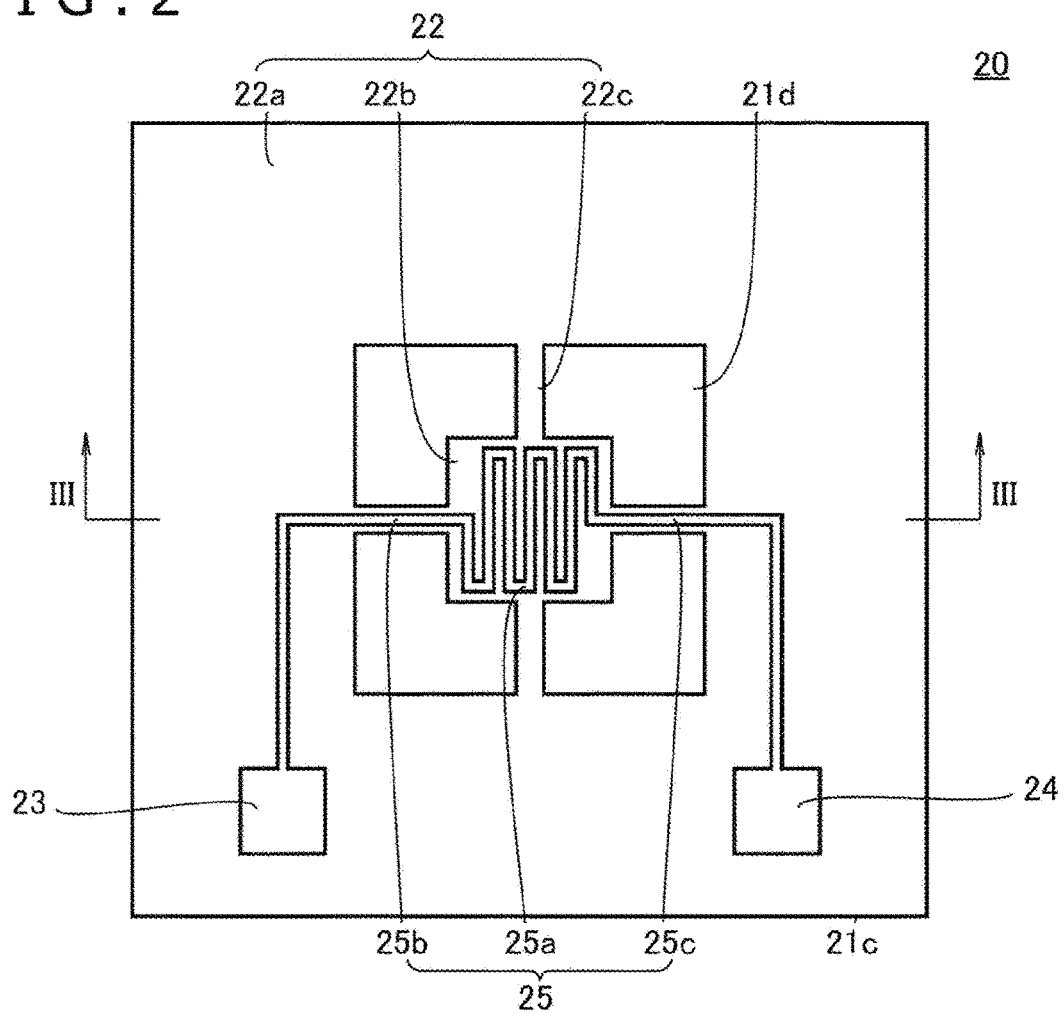
FIG. 2 is a plan view of a microheater.
Figure 3:
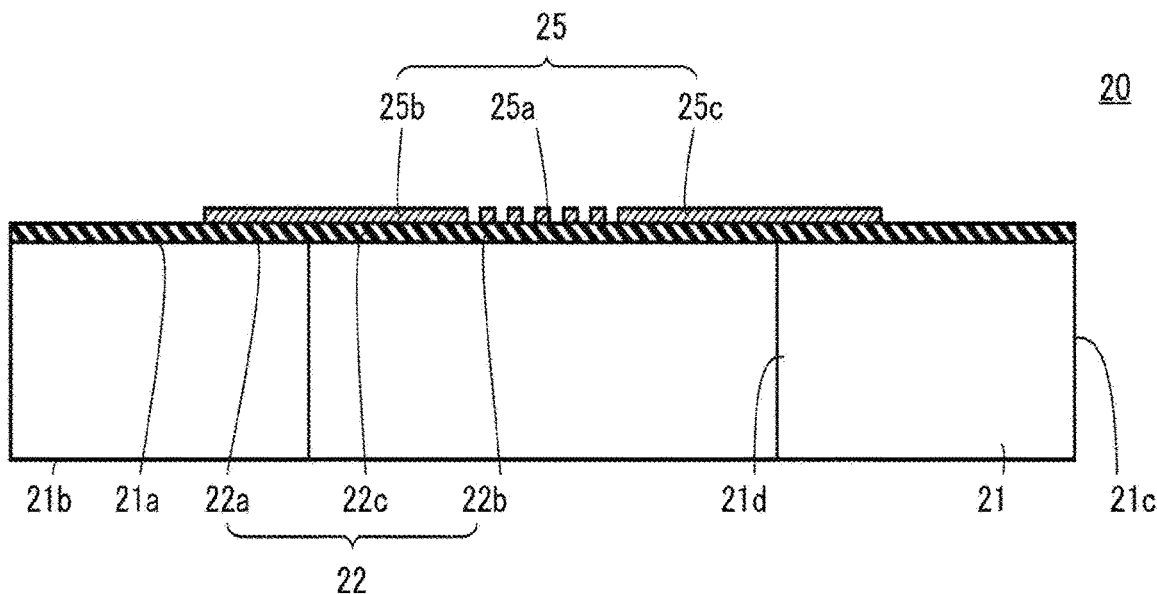
FIG. 3 is a sectional view of the microheater taken along line III-III in FIG. 2.

FIG. 2 is a plan view of the microheater 20. FIG. 3 is a sectional view of the microheater 20 taken along line III-III in FIG. 2. As illustrated in FIGS. 2 and 3, the microheater 20 includes a board 21, an insulating film 22, pads 23 and 24, and a wire 25.

The board 21 is made of, for example, silicon (Si). The board 21 includes a principal surface 21a, a principal surface 21b, and a side surface 21c. The principal surface 21a and the principal surface 21b each form an end surface at an end of the board 21 in a thickness direction thereof. The principal surface 21b is a surface opposite to the principal surface 21a. The side surface 21c is continuous with both the principal surface 21a and the principal surface 21b. The board 21 has a rectangular shape in a plan view (i.e., when viewed in a direction perpendicular to the principal surface 21a).

The board 21 has an opening portion 21d defined therein. The opening portion 21d is located in a center of the board 21 in the plan view. The opening portion 21d passes through the board 21 along the thickness direction (i.e., a direction from the principal surface 21a toward the principal surface 21b). The opening portion 21d has a rectangular shape in the plan view.

The insulating film 22 is made of an insulating material. The insulating film 22 is, for example, a film formed by a silicon nitride film and a silicon oxide film placed one on top of the other. The insulating film 22 includes a peripheral portion 22a, a central portion 22b, and connection portions 22c.

The peripheral portion 22a is disposed on the principal surface 21a. The central portion 22b is located in the center of the board 21 in the plan view. That is, the central portion 22b is located over the opening portion 21d. Each connection portion 22c is connected to the peripheral portion 22a at one end, and is connected to the central portion 22b at another end. The central portion 22b is thus supported over the opening portion 21d.

The pad 23 and the pad 24 are each disposed on the insulating film 22. More specifically, the pad 23 and the pad 24 are each disposed on the peripheral portion 22a.

The wire 25 is disposed on the insulating film 22. The wire 25 is connected to the pad 23 at one end, and is connected to the pad 24 at another end. The wire 25 includes a heater 25a, a connection portion 25b, and a connection portion 25c.

The heater 25a is disposed on the central portion 22b. A portion of the wire 25 extends in a zigzag pattern on the central portion 22b to form the heater 25a. The connection portion 25b connects the heater 25a and the pad 23 to each other. The connection portion 25c connects the heater 25a and the pad 24 to each other. The heater 25a is thus electrically connected to the pad 23 and the pad 24. The connection portion 25b and the connection portion 25c each pass on a different one of the connection portions 22c. Electric current is passed through the heater 25a, so that the heater 25a generates heat.

The pad 23, the pad 24, and the wire 25 are each made of an electrically conductive material. The electrically conductive material is, for example, a metal material. The metal material is, for example, platinum (Pt).

An electrical resistance value of the heater 25a is dependent on temperature. If a wind passes near the heater 25a, the heater 25a is cooled, resulting in a change in the electrical resistance value of the heater 25a. The flow sensor 10 outputs a signal that varies according to the electrical resistance value of the heater 25a.

The IC chip 30 includes, for example, a power supply circuit, a measuring circuit, an analog-to-digital conversion circuit, and a signal processing circuit. The power supply circuit is connected to the pad 23 and the pad 24 to supply constant electric current to the heater 25a. The measuring circuit is connected to the pad 23 and the pad 24 to measure a voltage applied to the heater 25a.

The analog-to-digital conversion circuit converts the voltage applied to the heater 25a and measured by the measuring circuit to a digital value, and outputs the digital value to the signal processing circuit. The signal processing circuit calculates the electrical resistance value of the heater 25a on the basis of the value of the electric current supplied to the heater 25a and the value of the voltage applied to the heater 25a. The flow sensor 10 is thus able to output the signal that varies according to the electrical resistance value of the heater 25a.

The plurality of flow sensors 10 include a first flow sensor 10A and a plurality of second flow sensors 10B. In the example illustrated in FIG. 1, the number of second flow sensors 10B is four. In the following description, the second flow sensors 10B may be referred to as a second flow sensor 10Ba, a second flow sensor 10Bb, a second flow sensor 10Bc, and a second flow sensor 10Bd, respectively.

Figure 4:
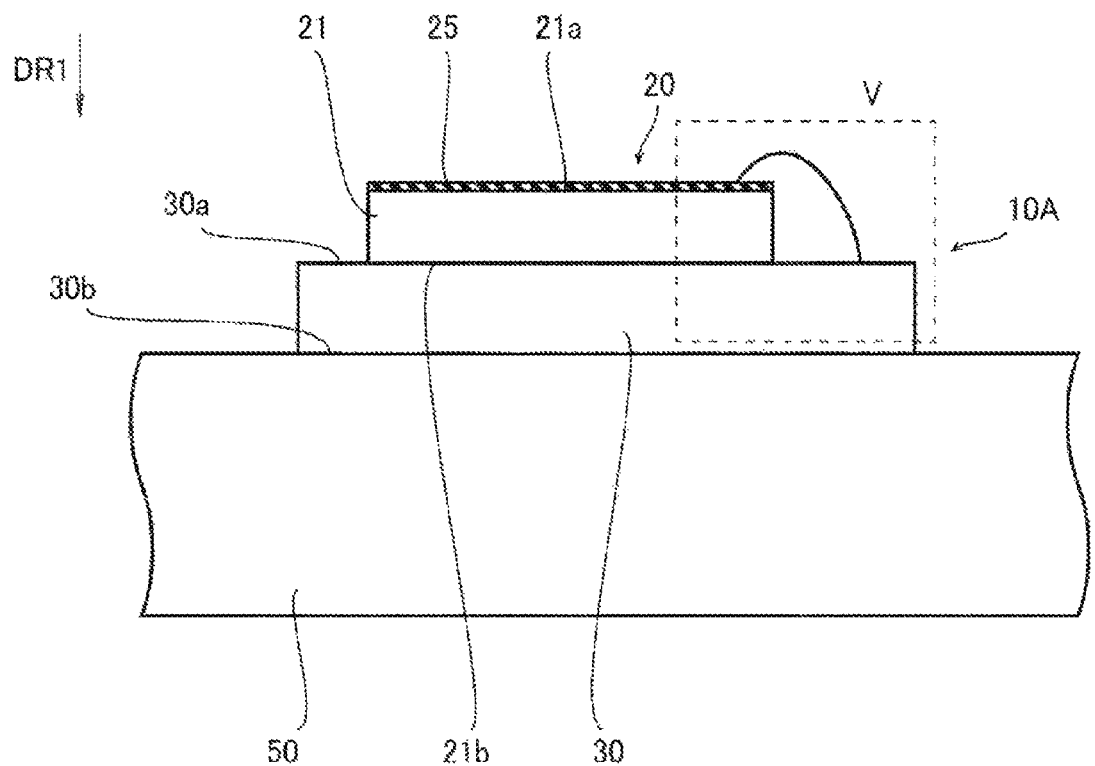
FIG. 4 is a schematic sectional view illustrating how the microheater is connected to an IC chip in a first flow sensor.
Figure 5:
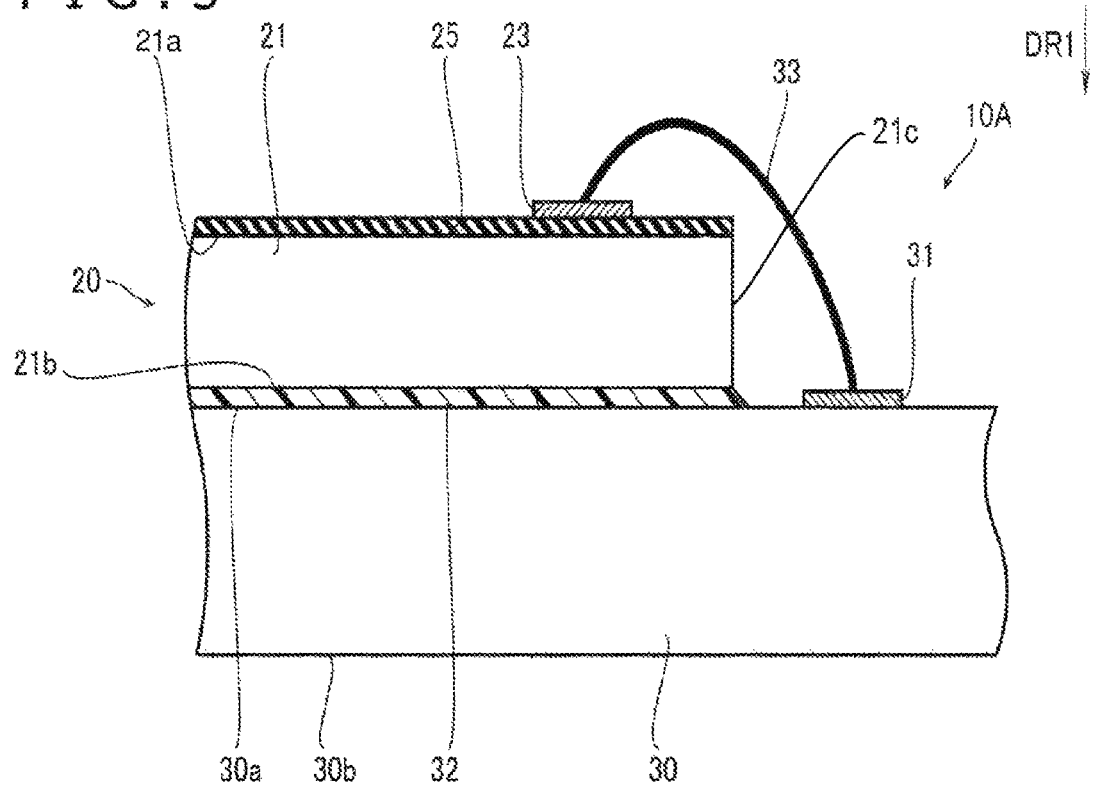
FIG. 5 is an enlarged view of an area indicated by "V" in FIG. 4.

FIG. 4 is a schematic sectional view illustrating how the microheater 20 is connected to the IC chip 30 in the first flow sensor 10A. FIG. 5 is an enlarged view of an area indicated by "V" in FIG. 4. As illustrated in FIGS. 4 and 5, in the first flow sensor 10A, the microheater 20 is disposed such that the direction from the principal surface 21a toward the principal surface 21b is along a first direction DR1. That is, in the first flow sensor 10A, the principal surface 21a and the principal surface 21b are each perpendicular to the first direction DR1.

The IC chip 30 includes a principal surface 30a and a principal surface 30b. The principal surface 30a and the principal surface 30b each form an end surface at an end of the IC chip 30 in a thickness direction thereof. The principal surface 30b is a surface opposite to the principal surface 30a. The principal surface 30a has pads 31 provided thereon. Each pad 31 is made of an electrically conductive material. The electrically conductive material is, for example, copper (Cu). In the first flow sensor 10A, the IC chip 30 is disposed such that the principal surface 30a and the principal surface 30b are each perpendicular to the first direction DR1.

In the first flow sensor 10A, the microheater 20 is attached to the IC chip 30 with use of, for example, an adhesive 32. The adhesive 32 is, for example, an epoxy adhesive. In the first flow sensor 10A, the pad 23 (the pad 24) and the pad 31 are connected to each other through a bonding wire 33.

Figure 6:
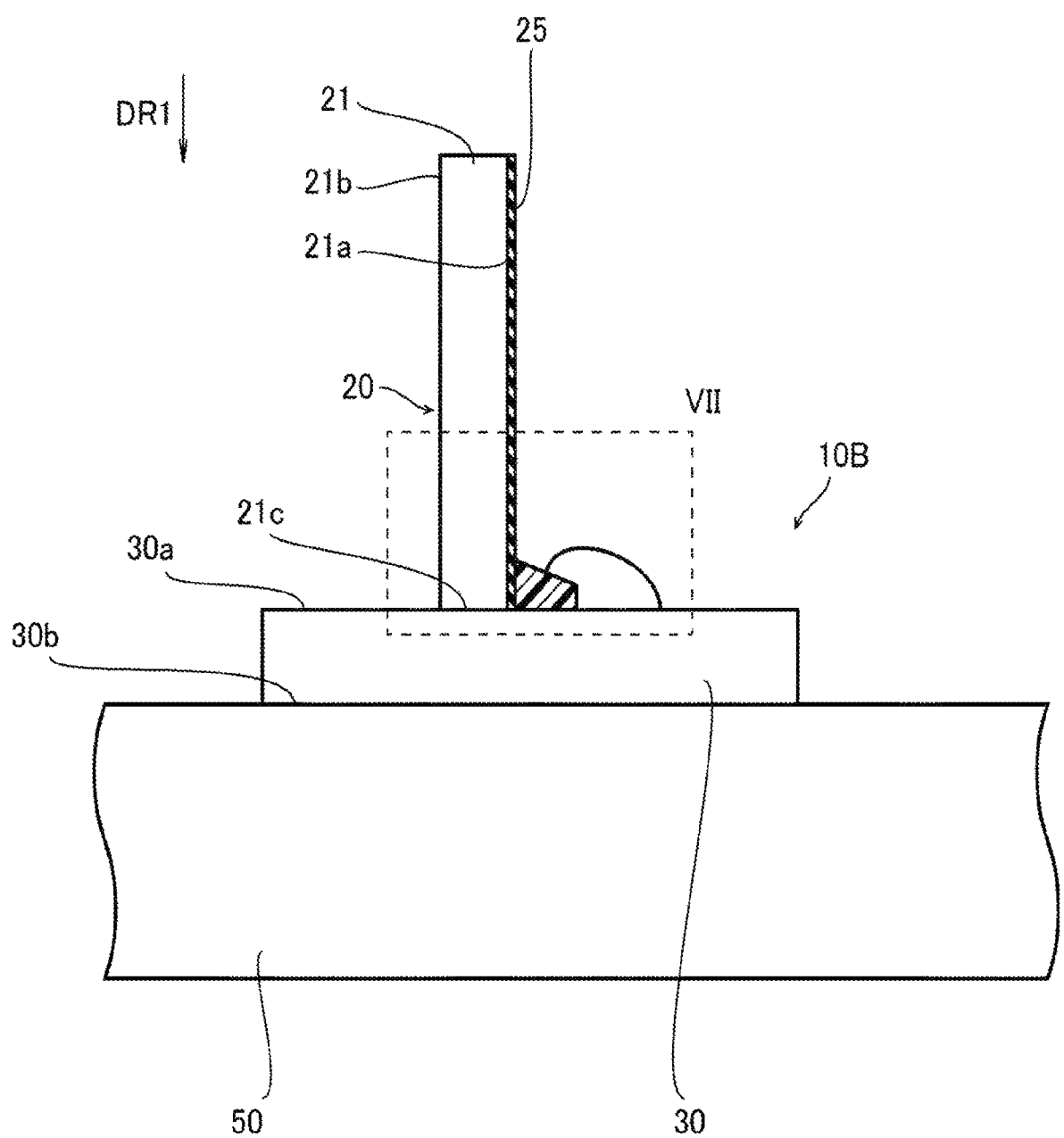
FIG. 6 is a schematic sectional view illustrating how the microheater is connected to the IC chip in a second flow sensor 10B.
Figure 7:
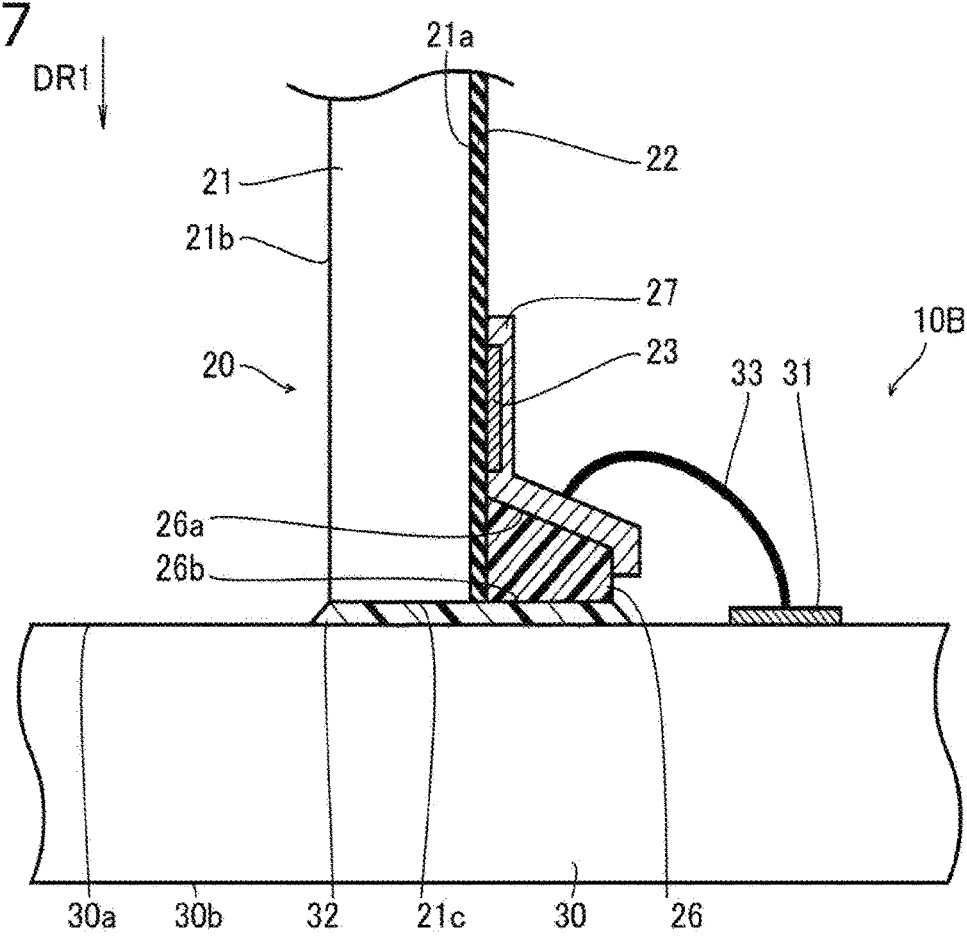
FIG. 7 is an enlarged view of an area indicated by "VII" in FIG. 6.

FIG. 6 is a schematic sectional view illustrating how the microheater 20 is connected to the IC chip 30 in each of the second flow sensors 10B. FIG. 7 is an enlarged view of an area indicated by "VII" in FIG. 6. As illustrated in FIGS. 6 and 7, the microheater 20 of the second flow sensor 10B further includes a standing wall 26 and a conducting film 27.

The standing wall 26 is disposed on the insulating film 22. More specifically, the standing wall 26 is disposed on the peripheral portion 22a. The standing wall 26 stands on the peripheral portion 22a, extending therefrom along a direction not parallel to the principal surface 21a.

The standing wall 26 includes a first surface 26 a and a second surface 26 b. The second surface 26 b is continuous with the side surface 21 c (the second surface 26 b and the side surface 21 c are flush with each other). The second surface 26 b is a surface opposite to the first surface 26 a. The standing wall 26 is located close to the pad 23 and the pad 24. The standing wall 26 is made of an insulating material. The insulating material is, for example, an epoxy resin material.

The conducting film 27 is formed over an area extending from on the pad 23 (the pad 24) onto the first surface 26 a. The conducting film 27 is made of an electrically conductive material. The conducting film 27 is formed by, for example, a titanium (Ti) film and a gold (Au) film placed on the titanium film.

In the second flow sensor 10B, the microheater 20 is disposed such that the side surface 21c and the first surface 26a are each opposed to the principal surface 30a. In the second flow sensor 10B, the microheater 20 is attached to the IC chip 30 with use of, for example, the adhesive 32.

The pad 31 and a portion of the conducting film 27 which is formed on the second surface 26b are connected to each other through a bonding wire 33. Electrical connection between the pad 23 (the pad 24) and the pad 31 is thus achieved. The bonding wire 33 is made of an electrically conductive material. The electrically conductive material is, for example, gold.

Figure 8A:
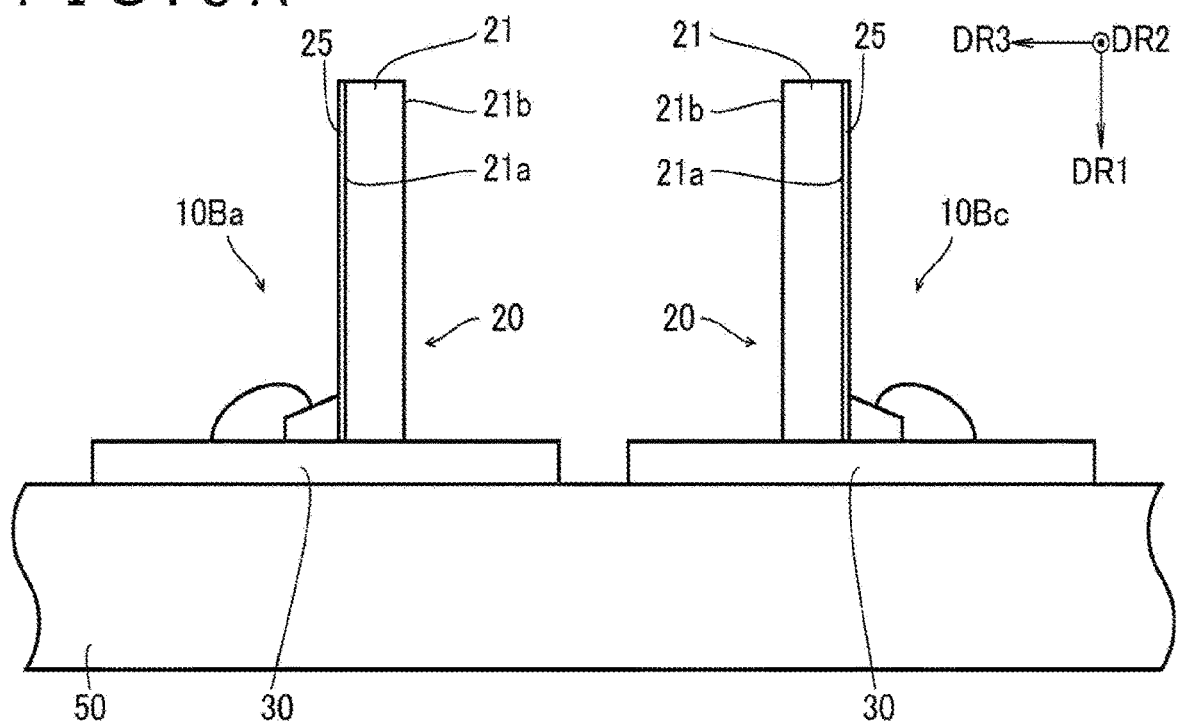
FIG. 8A is a schematic side view illustrating an arrangement of a second flow sensor 10Ba and a second flow sensor 10Bc.

FIG. 8A is a schematic side view illustrating an arrangement of the second flow sensor 10Ba and the second flow sensor 10Bc. In FIG. 8A, the second flow sensor 10Bb, the second flow sensor 10Bd, and the first flow sensor 10A are not depicted. As illustrated in FIG. 8A, in each of the second flow sensor 10Ba and the second flow sensor 10Bc, the microheater 20 is disposed such that the principal surface 21a and the principal surface 21b are each perpendicular to a plane perpendicular to the first direction DR1.

In the second flow sensor 10Ba, the microheater 20 is disposed such that a direction from the principal surface 21b toward the principal surface 21a forms an angle of 90° with a second direction DR2. In the second flow sensor 10Bc, the microheater 20 is disposed such that the direction from the principal surface 21b toward the principal surface 21a forms an angle of 270° with the second direction DR2. The second direction DR2 is a direction perpendicular to the first direction DR1.

Figure 8B:
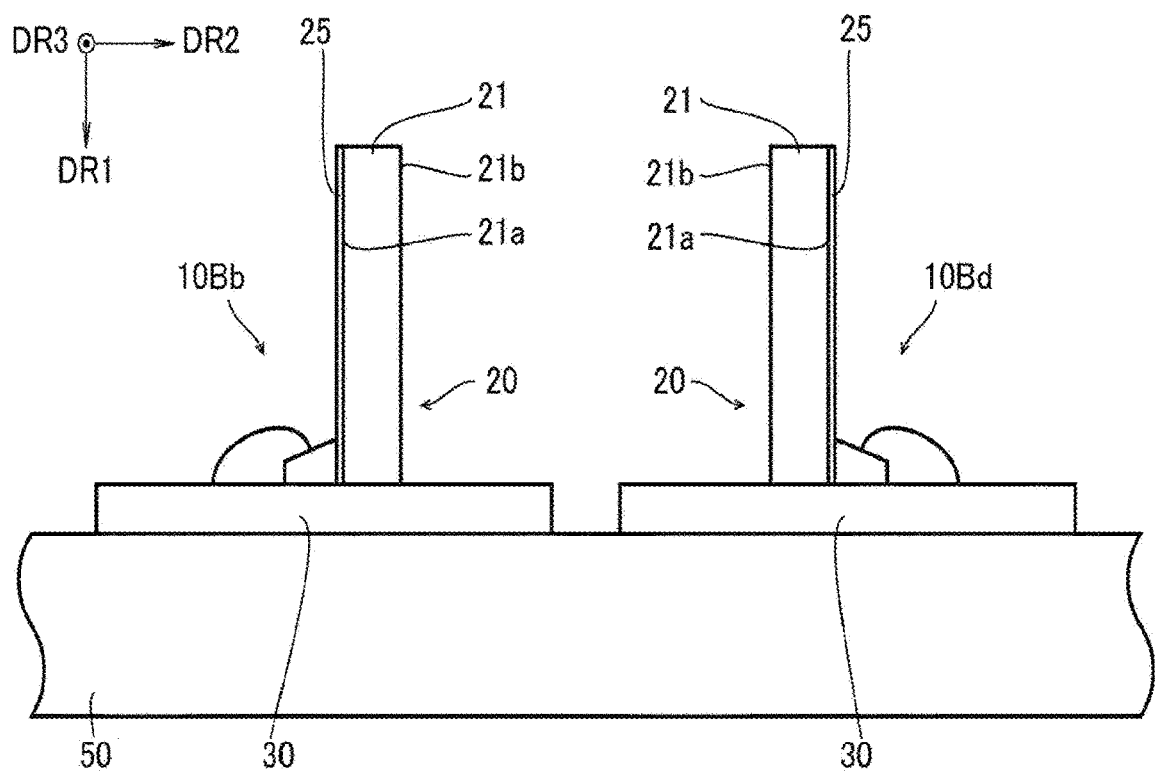
FIG. 8B is a schematic side view illustrating an arrangement of a second flow sensor 10Bb and a second flow sensor 10Bd.

FIG. 8B is a schematic side view illustrating an arrangement of the second flow sensor 10Bb and the second flow sensor 10Bd. In FIG. 8B, the second flow sensor 10Ba, the second flow sensor 10Bc, and the first flow sensor 10A are not depicted. As illustrated in FIG. 8B, in each of the second flow sensor 10Bb and the second flow sensor 10Bd, the microheater 20 is disposed such that the principal surface 21a and the principal surface 21b are each perpendicular to the plane perpendicular to the first direction DR1.

In the second flow sensor 10Bb, the microheater 20 is disposed such that the direction from the principal surface 21b toward the principal surface 21a forms an angle of 180° with the second direction DR2. In the second flow sensor 10Bd, the microheater 20 is disposed such that the direction from the principal surface 21b toward the principal surface 21a forms an angle of 0° with the second direction DR2.

In each of the second flow sensors 10Ba to 10Bd, the IC chip 30 is disposed such that the principal surface 30a and the principal surface 30b are each perpendicular to the first direction DR1. As illustrated in FIGS. 6, 7, 8A, and 8B, in each of the second flow sensors 10Ba to 10Bd, the IC chip 30 is disposed on a board 50.

Although not depicted in the figures, the processor 40 is also disposed on the board 50. The processor 40 is electrically connected to each of the second flow sensors 10Ba to 10Bd and the first flow sensor 10A through a wire (not depicted) formed on the board 50.

As illustrated in FIG. 1, outputs from the first flow sensor 10A and the second flow sensors 10Ba to 10Bd are inputted to the processor 40. The processor 40 is configured to calculate the speed and the direction of a wind blowing against the wind measuring system 100 on the basis of the outputs from the first flow sensor 10A and the second flow sensors 10Ba to 10Bd.

<Characteristics of Flow Sensor 10>

It is assumed that F denotes the output from the flow sensor 10. It is also assumed that $F_{max}$ denotes a maximum value among the outputs from all the flow sensors 10 included in the wind measuring system 100. It is also assumed that $v_0$ denotes a wind speed at the flow sensor 10. It is also assumed that φ denotes an angle formed by the principal surface 21a with a direction of a wind blowing against the flow sensor 10.

Figure 9:
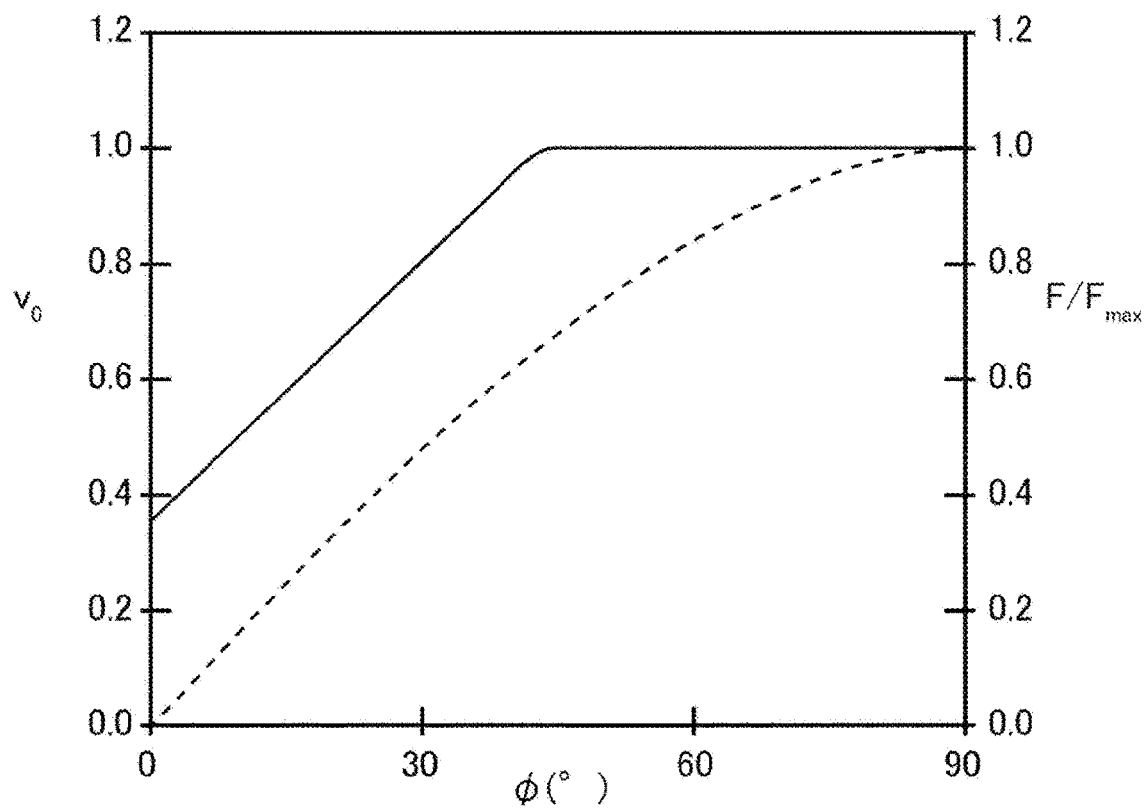
FIG. 9 is a schematic graph illustrating the relations among $\varphi$, $F/F_{max}$, and $v_0$.

FIG. 9 is a schematic graph illustrating the relations among φ, $F/F_{max}$, and $v_0$. In the graph of FIG. 9, a solid line represents $F/F_{max}$, and a dotted line represents $v_0$. As illustrated in FIG. 9, within a range in which the value of $F/F_{max}$ is sufficiently smaller than 1 ($F/F_{max} \ll 1$), the values of $F/F_{max}$ and $v_0$ increase as the value of φ increases. That is, using a function (hereinafter referred to as a "correction function g") representing a correction coefficient indicative of the relation between $v_0$ and $F/F_{max}$, an equation, $v_0 = g(F/F_{max})$, holds. Therefore, if the correction function g is determined in advance through an experiment, a simulation, etc., the value of $v_0$ can be calculated by substituting the value of $F/F_{max}$ into the equation.

<Algorithm for Calculating Wind Speed and Wind Direction in Wind Measuring System 100>

Figure 10:
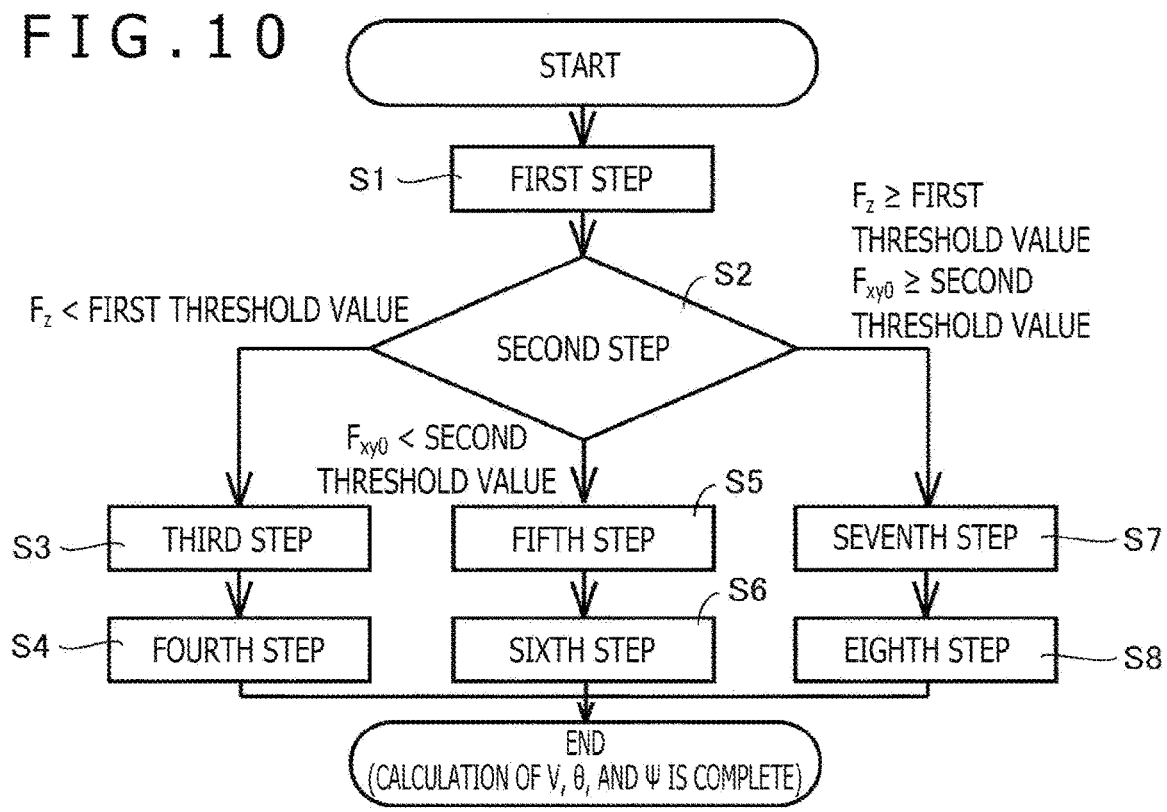
FIG. 10 is a flowchart for calculating the wind speed and the wind direction of a wind blowing against the wind measuring system.

FIG. 10 is a flowchart for calculating the wind speed and the wind direction of a wind blowing against the wind measuring system 100. As illustrated in FIG. 10, the processor 40 performs a first step S1, a second step S2, a third step S3, a fourth step S4, a fifth step S5, a sixth step S6, a seventh step S7, and an eighth step S8 to calculate the wind speed and the wind direction of the wind blowing against the wind measuring system 100.

It is assumed that $F_z$, $F_{xy1}$, $F_{xy2}$, $F_{xy3}$, and $F_{xy4}$ denote the outputs from the first flow sensor 10A and the second flow sensors 10Ba to 10Bd, respectively. It is also assumed that V denotes the speed of the wind blowing against the wind measuring system 100. It is also assumed that $V_z$ denotes the speed of the wind blowing against the wind measuring system 100 in the first direction DR1.

It is assumed that $V_{xy}$ denotes the speed of the wind blowing against the wind measuring system 100 on the plane perpendicular to the first direction DR1. It is also assumed that $V_{xy1}$ denotes the speed of the wind blowing against the wind measuring system 100 in a third direction DR3. The third direction DR3 is a direction perpendicular to both the second direction DR2 and the first direction DR1 (see FIGS.

8A and 8B). It is also assumed that $V_{xy2}$ denotes the speed of the wind blowing against the wind measuring system 100 in the second direction DR2.

It is assumed that $\Psi$ denotes an angle formed by the wind blowing against the wind measuring system 100 with the first direction DR1. It is also assumed that $\theta$ denotes an angle formed by the wind blowing against the wind measuring system 100 with the second direction DR2 on the plane perpendicular to the first direction DR1.

In the first step S1, normalization of $F_{xy1}$ to $F_{xy4}$ is performed. This normalization is performed by dividing the value of each of $F_{xy1}$ to $F_{xy4}$ by a constant such that a maximum value of $F_{xy1}$ to $F_{xy4}$ normalized will be 1. It is assumed that $F_{xy0}$ denotes a maximum value among $F_{xy1}$ to $F_{xy4}$ normalized.

The second step S2 is performed after the first step S1. In the second step S2, $F_{xy0}$ and $F_z$ are each compared with a predetermined threshold value.

In a case where $F_z$ is smaller than a first threshold value, the processor 40 performs the third step S3 and the fourth step S4. The first threshold value is a value sufficiently smaller than $F_{xy0}$. The first threshold value is, for example, a value obtained by multiplying $F_{xy0}$ by a predetermined coefficient. This predetermined coefficient is smaller than 0.5. This predetermined coefficient is, for example, 0.4.

In a case where $F_{xy0}$ is smaller than a second threshold value, the processor 40 performs the fifth step S5 and the sixth step S6. The second threshold value is a value sufficiently smaller than $F_z$. The second threshold value is, for example, a value obtained by multiplying $F_z$ by a predetermined coefficient. This predetermined coefficient is smaller than 0.5. This predetermined coefficient is, for example, 0.4.

In the other cases (i.e., in a case where $F_z$ is equal to or greater than the first threshold value, and $F_{xy0}$ is equal to or greater than the second threshold value), the processor 40 performs the seventh step S7 and the eighth step S8.

In the case where $F_z$ is smaller than the first threshold value, $V_z$ can be considered to be 0. Accordingly, the processor 40 determines that $V_z=0$ and $\Psi=90°$ in the third step S3. In the fourth step S4, the values of $\theta$ and $V_{xy}$ are calculated. Note that, in this case, $V=V_{xy}$ because $V_z$ is 0.

Figure 11:
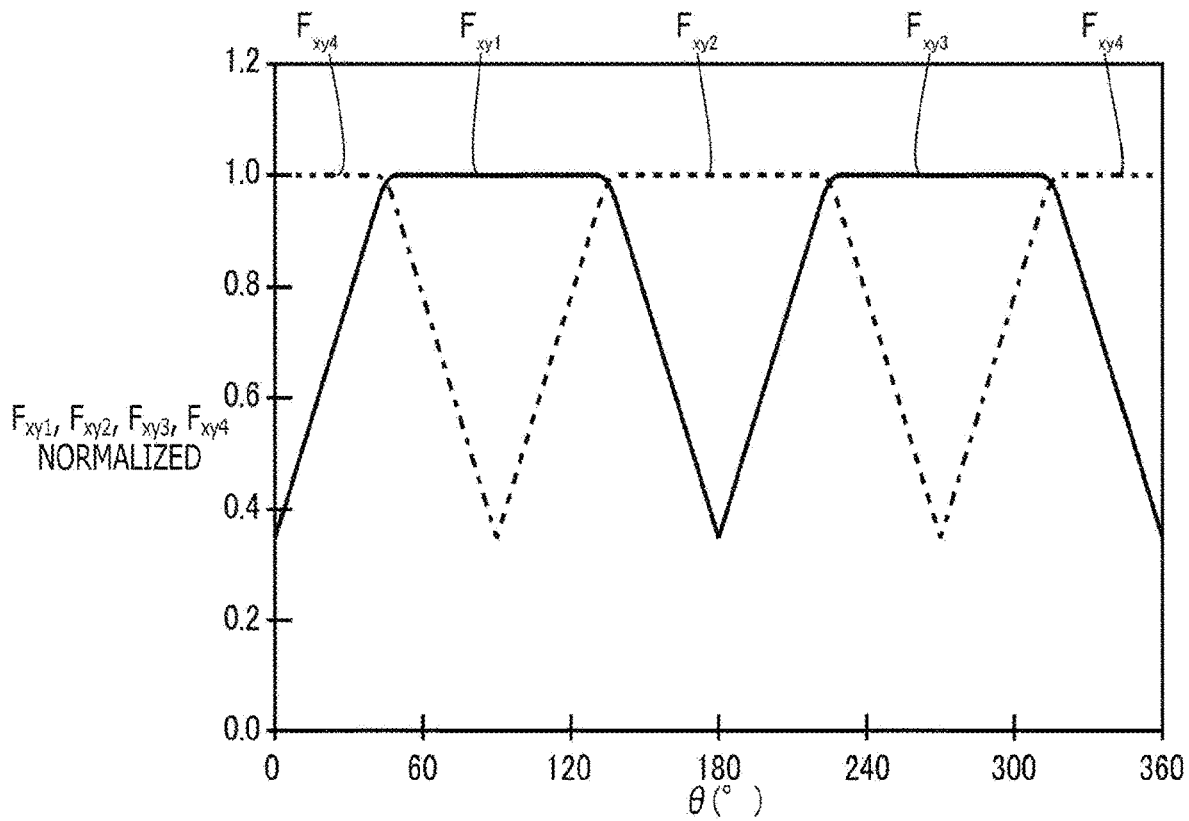
FIG. 11 is a schematic graph illustrating the relation between $\theta$ and each of $F_{xy1}$ to $F_{xy4}$ normalized.

FIG. 11 is a schematic graph illustrating the relation between $\theta$ and each of $F_{xy1}$ to $F_{xy4}$ normalized. As illustrated in FIG. 11, $F_{xy1}$ normalized has a value of 1 within an angular range of approximately 90°. The value of $F_{xy1}$ normalized decreases as the value of $\theta$ increases or decreases away from the angular range in which $F_{xy1}$ has a value of 1. The same is true of $F_{xy2}$ to $F_{xy4}$ normalized. It should be noted, however, that a range of $\theta$ in which $F_{xy1}$ normalized has a value of 1, a range of $\theta$ in which $F_{xy2}$ normalized has a value of 1, a range of $\theta$ in which $F_{xy3}$ normalized has a value of 1, and a range of $\theta$ in which $F_{xy4}$ normalized has a value of 1 do not overlap with one another.

In the fourth step S4, the processor 40 first identifies which of $F_{xy1}$ to $F_{xy4}$ normalized exceeds a third threshold value. The third threshold value is smaller than 1 and equal to or greater than 0.5 (e.g., 0.8). Secondly, the processor 40 identifies the range of $\theta$ on the basis of which of $F_{xy1}$ to $F_{xy4}$ exceeds the third threshold value. In a case of the example illustrated in FIG. 11, if the third threshold value is 0.8, and $F_{xy1}$ and $F_{xy2}$ each exceed the third threshold value, it can be determined that $\theta$ is within the range of 110° to 160° both inclusive.

Thirdly, the processor 40 applies the correction function g to the smaller one of the values of $F_{xy1}$ to $F_{xy4}$ which exceed the third threshold value. In a case of the above example, $F_{xy1}$ is smaller than $F_{xy2}$, and therefore, the processor 40 applies the correction function g to $F_{xy1}$ (that is, calculates $g(F_{xy1}d)$. The value of $V_{xy1}$ is thus obtained. Because $\theta=\sin^{-1}(V_{xy1})$ and $V_{xy}=V_{xy1}/\sin\theta$, the values of $\theta$ and $V_{xy}$ can be obtained by substituting the obtained value of $V_{xy1}$ into these equations.

In the case where $F_{xy0}$ is smaller than the second threshold value, $V_{xy}$ can be considered to be 0. Accordingly, the processor 40 determines that $V_{xy}=0$ and $\Psi=0°$ in the fifth step S5. Note that, in this case, the value of 0 is imperceptible because $V_{xy}=0$. In the sixth step S6, the value of $V_z$ is calculated. More specifically, in the sixth step S6, the processor 40 applies the correction function g to $F_z$ (that is, calculates $g(F_z)$). The value of $V_z$ is thus obtained. Note that, in this case, $V=V_z$ because $V_{xy}$ is 0.

In the seventh step S7, the processor 40 performs a process similar to that of the fourth step S4. The values of $\theta$ and $V_{xy}$ are thus obtained.

In the eighth step S8, the processor 40 calculates the values of $\Psi$ and V. First, the processor 40 applies an inverse function of the correction function g to $V_{xy}$ (that is, calculates $g^{-1}(V_{xy})$). A value obtained as a result is hereinafter referred to as $F_{xy}$. Secondly, the processor 40 normalizes $F_{xy}$ and $F_z$. This normalization is performed by dividing the value of each of $F_{xy}$ and $F_z$ by a constant such that a maximum value of $F_{xy}$ and $F_z$ normalized will be 1.

Secondly, the processor 40 compares the values of $F_{xy}$ and $F_z$ normalized with each other. Thirdly, the processor 40 calculates the values of $\Psi$ and V on the basis of the result of the above comparison and the correction function g. Suppose, for example, that $F_z > F_{xy}$. In this case, the processor 40 replaces $F_z$ with 1, and replaces $F_{xy}$ with $F_{xy}/F_z$. Moreover, the processor 40 applies the correction function g to $F_{xy}$ obtained after the replacement (that is, calculates $g(F_{xy})$), thereby obtaining the value of V. Because $\Psi=\sin^{-1}(V_{xy})$ and $V=V_{xy}/\sign\Psi$, the values of $\Psi$ and V can be obtained by substituting the obtained value of $V_{xy}$ into these equations.

(Advantageous Effect of Wind Measuring System According to Embodiment)

An advantageous effect of the wind measuring system 100 will be described below.

As described above, the wind measuring system 100 is able to calculate the values of V ($V_z$ and $V_{xy}$), $\theta$, and $\Psi$. Thus, the wind measuring system 100 is able to calculate not only the speed of the wind blowing against the wind measuring system 100 but also the direction of the wind.

(Modifications)

The number of second flow sensors 10B is not limited to four. For example, the number of second flow sensors 10B may be three. In this case, the microheaters 20 of the second flow sensors 10B are disposed such that the direction from the principal surface 21b toward the principal surface 21a forms angles of 120°, 240°, and 0°, respectively, with the second direction DR2.

It should be understood by those skilled in the art that various modifications, combinations, sub-combinations and alterations may occur depending on design requirements and other factors insofar as they are within the scope of the appended claims or the equivalents thereof.

What is claimed is:
1. A wind measuring system comprising:
a first flow sensor; and
a plurality of second flow sensors, wherein
the first flow sensor and the plurality of second flow sensors each include a microheater including a board, an insulating film, and a heater, the board includes a first principal surface and a second principal surface opposite to the first principal surface, the board has defined therein an opening portion passing through the board along a direction from the first principal surface toward the second principal surface, the insulating film includes a peripheral portion disposed on the first principal surface, a central portion having the heater disposed thereon, and a connection portion extending from the central portion to be connected to the peripheral portion to support the central portion over the opening portion, the first flow sensor and the plurality of second flow sensors are each configured to output a signal that varies according to a change in electrical resistance value of the heater, the microheater of the first flow sensor is disposed such that the direction from the first principal surface toward the second principal surface is along a first direction, in each of the plurality of second flow sensors, the microheater is disposed such that the first principal surface and the second principal surface are each perpendicular to a plane perpendicular to the first direction, and a direction from the second principal surface toward the first principal surface in the microheater of each of the plurality of second flow sensors forms a different angle with a second direction perpendicular to the first direction.

2. The wind measuring system according to claim 1, wherein the direction from the second principal surface toward the first principal surface in the microheaters of the plurality of second flow sensors forms angles of 90°, 180°, 270°, and 0°, respectively, with the second direction.

3. The wind measuring system according to claim 1, wherein the board further includes a side surface, each of the plurality of second flow sensors further includes an integrated circuit chip and a bonding wire, the microheater of each of the second flow sensors further includes a first pad disposed on the peripheral portion and electrically connected to the heater, a standing wall disposed on the peripheral portion, and a conducting film, the standing wall includes a first surface and a second surface opposite to the first surface, the second surface is continuous with the side surface, the conducting film is formed over an area extending from on the first pad onto the first surface, the integrated circuit chip includes a third principal surface and a second pad disposed on the third principal surface, in each of the plurality of second flow sensors, the microheater is disposed such that the side surface is opposed to the third principal surface, and the second pad is connected to a portion of the conducting film that lies on the second surface through the bonding wire.

* * * * *